United States Patent
Chen et al.

(10) Patent No.: US 7,533,415 B2
(45) Date of Patent: May 12, 2009

(54) METHOD AND APPARATUS FOR CONTROLLING TRAFFIC IN A COMPUTER NETWORK

(75) Inventors: Yi-Fen Chen, Pasadena, CA (US);
Yung-Chang Liang, Cupertino, CA (US); En-Yi Liao, Santa Clara, CA (US)

(73) Assignee: Trend Micro Incorporated, Tokyo (JP)

( * ) Notice: Subject to any disclaimer, the term of this patent is extended or adjusted under 35 U.S.C. 154(b) by 752 days.

(21) Appl. No.: 10/829,466

(22) Filed: Apr. 21, 2004

(65) Prior Publication Data

US 2005/0238005 A1    Oct. 27, 2005

(51) Int. Cl.
*G06F 11/00* (2006.01)
(52) U.S. Cl. .................. 726/24; 726/1; 726/3; 726/22; 726/23; 709/208; 709/223; 709/224; 709/227
(58) Field of Classification Search .............. 726/3, 726/13, 22–24, 1; 709/223–224, 225, 208, 709/227; 370/218, 392, 410, 400–401; 713/1
See application file for complete search history.

(56) References Cited

U.S. PATENT DOCUMENTS

| | | | |
|---|---|---|---|
| 5,444,850 A | 8/1995 | Chang | |
| 5,623,600 A | 4/1997 | Ji et al. | |
| 5,680,547 A | 10/1997 | Chang | |
| 5,781,550 A | 7/1998 | Templin et al. | |
| 5,889,943 A | 3/1999 | Ji et al. | |
| 5,951,698 A | 9/1999 | Chen et al. | |
| 5,960,170 A | 9/1999 | Chen et al. | |
| 5,983,348 A | 11/1999 | Ji | |
| 6,061,796 A | 5/2000 | Chen et al. | |
| 6,076,114 A * | 6/2000 | Wesley | 709/235 |
| 6,119,165 A | 9/2000 | Li et al. | |
| 6,272,641 B1 | 8/2001 | Ji | |
| 6,393,487 B2 | 5/2002 | Boucher et al. | |
| 6,519,263 B1 * | 2/2003 | Huth | 370/444 |
| 6,587,874 B1 | 7/2003 | Golla et al. | |
| 6,629,100 B2 | 9/2003 | Morris et al. | |
| 6,650,641 B1 * | 11/2003 | Albert et al. | 370/392 |
| 6,654,373 B1 * | 11/2003 | Maher et al. | 370/392 |
| 6,678,734 B1 | 1/2004 | Haatainen et al. | |
| 6,717,943 B1 * | 4/2004 | Schwering | 370/389 |
| 6,779,004 B1 | 8/2004 | Zintel | |
| 6,789,117 B1 | 9/2004 | Joiner et al. | |
| 6,892,230 B1 | 5/2005 | Gu et al. | |
| 7,028,335 B1 * | 4/2006 | Borella et al. | 726/11 |
| 7,082,134 B1 * | 7/2006 | Lim et al. | 370/392 |

(Continued)

OTHER PUBLICATIONS

International Search Report for International Application No. PCT/US05/05279 (2 sheets).

*Primary Examiner*—Thanhnga B Truong
(74) *Attorney, Agent, or Firm*—Okamoto & Benedicto LLP (57) ABSTRACT

In one embodiment, a technique for controlling traffic in a computer network includes modifying a packet generated by a first computer. The packet may be intended for a second computer, but is modified to be redirected to a third computer. The packet may be processed in the third computer prior to being forwarded from the third computer to the second computer. The packet may be scanned for viruses at the third computer, for example. Among other advantages, the technique allows for scanning of early generated packets, redirection of selected packets, and routing of packets from a computer in general.

9 Claims, 7 Drawing Sheets

U.S. PATENT DOCUMENTS

| | | |
|---|---|---|
| 7,092,399 B1 * | 8/2006 | Cheriton .................... 370/401 |
| 2002/0147780 A1 | 10/2002 | Liu et al. |
| 2002/0156917 A1 | 10/2002 | Nye |
| 2002/0178381 A1 | 11/2002 | Lee et al. |
| 2002/0198930 A1 | 12/2002 | Jones et al. |
| 2003/0021280 A1 | 1/2003 | Makinson et al. |
| 2003/0028585 A1 | 2/2003 | Yeager et al. |
| 2003/0055962 A1 | 3/2003 | Freund et al. |
| 2003/0212710 A1 | 11/2003 | Guy |
| 2004/0088646 A1 | 5/2004 | Yeager et al. |
| 2004/0158741 A1 | 8/2004 | Schneider |

* cited by examiner

METHOD AND APPARATUS FOR CONTROLLING TRAFFIC IN A COMPUTER NETWORK

BACKGROUND OF THE INVENTION

1. Field of the Invention

The present invention relates generally to computer systems, and more particularly but not exclusively to computer networks.

2. Description of the Background Art

As is well known, computers belonging to a computer network may send data to one another. Data may be encapsulated and forwarded to other computers in packets. A packet may include a header indicating the source and the destination of the packet. For example, in an Ethernet packet, the MAC (Media Access Control) addresses of the source computer and the destination computer may be indicated in an Ethernet header. Generally speaking, a MAC address is a hardware address that uniquely identifies a computer in a computer network.

Figure 1:
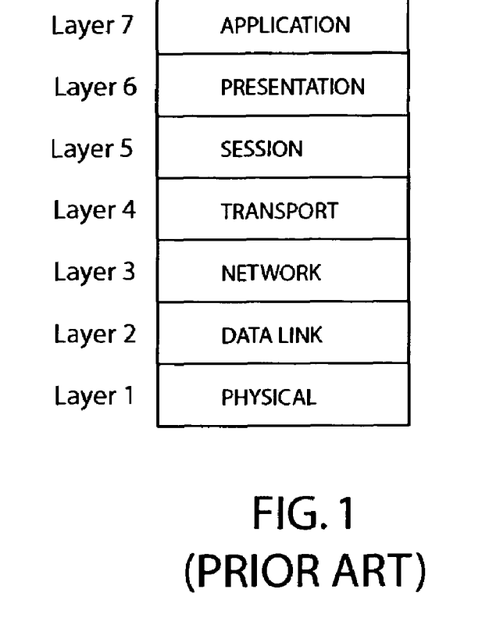
FIG. 1 schematically illustrates the OSI model.

Computers in a computer network may communicate using the so-called OSI (Open System Interconnection) model, which is schematically illustrated in FIG. 1. The OSI model is well known in the art so it is only briefly described here. The OSI model has seven layers namely, layer 1 to layer 7. Layer 1 is the so-called "physical layer" and has to do with the physical medium that connects the computers together. Layer 7 is the so-called "application layer" and comprises applications enabled to communicate over the network. Layers 2-6 allow data from applications in layer 7 to be formatted into a packet, which is forwarded to a destination computer over physical media comprising layer 1. The destination computer may receive the packet and extract the data from it also in accordance with the OSI model. Components for allowing a computer to communicate over a network, such as components corresponding to the layers of the OSI model, are also referred to herein as a "networking stack." A TCP/IP stack is an example networking stack in an Ethernet network.

Figure 2:
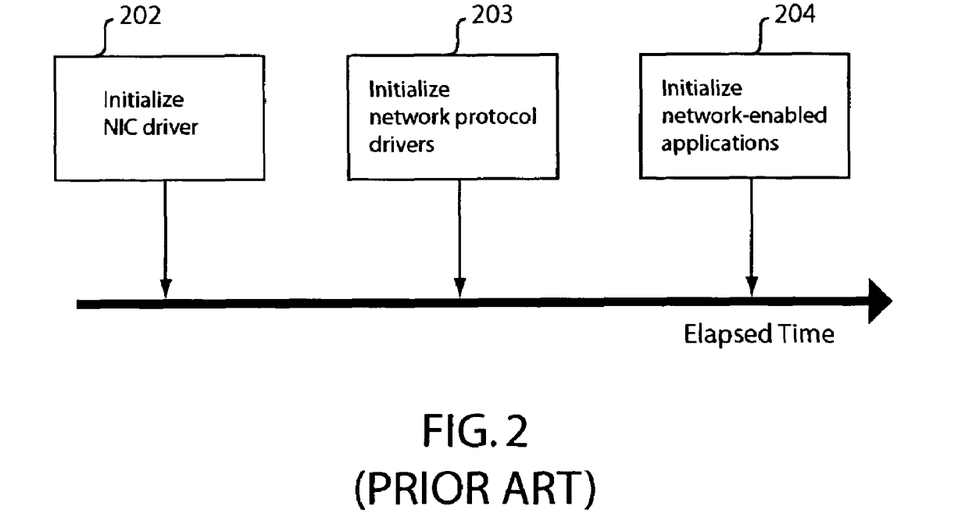
FIG. 2 schematically illustrates a boot up sequence for a computer coupled to a network.

FIG. 2 schematically illustrates a boot up sequence for a computer coupled to a network. In step 202, a network interface card (NIC) driver in the computer is initialized. The NIC and its driver operate at layer 2 of the OSI model. In step 203, network protocol drivers, which operate at layer 3 of the OSI model, are initialized. In step 204, network-enabled applications at layer 7 of the OSI model are initialized. The aforementioned initialization process is performed in sequence. That is, network protocol drivers are initialized after the NIC driver; network-enabled applications are initialized after the network protocol drivers.

A computer may generate and transmit packets before its networking stack is completely initialized. Example packets that are generated prior to complete networking stack initialization include DHCP (Dynamic Host Configuration Protocol) and ARP (Address Resolution Protocol) packets. These packets, which are also referred to as "pre-IP" packets in an Ethernet network, may be generated by a computer prior to full initialization of network protocol drivers in layer 3. For example, in a computer configured as a DHCP client, initialization of network protocol drivers in step 203 requires the computer to send out DHCP request packets to a DHCP server to retrieve IP parameters, such as IP address, DNS server information, and default gateway server information. It is possible for these pre-IP packets to carry malicious content, such as a computer virus. Unfortunately, most computers are not capable of scanning packets for malicious content prior to complete initialization of the networking stack. Furthermore, antivirus enforcement policies implemented at a switch level may not allow a computer to transmit these pre-IP packets over the network, thereby preventing the computer from properly booting up.

SUMMARY

In one embodiment, a technique for controlling traffic in a computer network includes modifying a packet generated by a first computer. The packet may be intended for a second computer, but is modified to be redirected to a third computer. The packet may be processed in the third computer prior to being forwarded from the third computer to the second computer. The packet may be scanned for viruses at the third computer, for example. Among other advantages, the technique allows for scanning of early generated packets, redirection of selected packets, and routing of packets from a computer in general.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described herein using an Ethernet network and DHCP (Dynamic Host Configuration Protocol) as examples. It should be understood, however, that the invention is not so limited and may be employed in conjunction with other computer networks and protocols.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention allow for redirection of data units in general. For example, embodiments of the invention may be employed to redirect early generated packets to another computer, where the packets may be scanned for viruses, for example. As another example, embodiments of the invention may be employed to quarantine selected packets by redirecting the packets to another computer (instead of the intended destination computer) where the packets may be held. Yet another example, embodiments of the invention may be employed as a software switch. These examples will be more apparent below.

Figure 3:
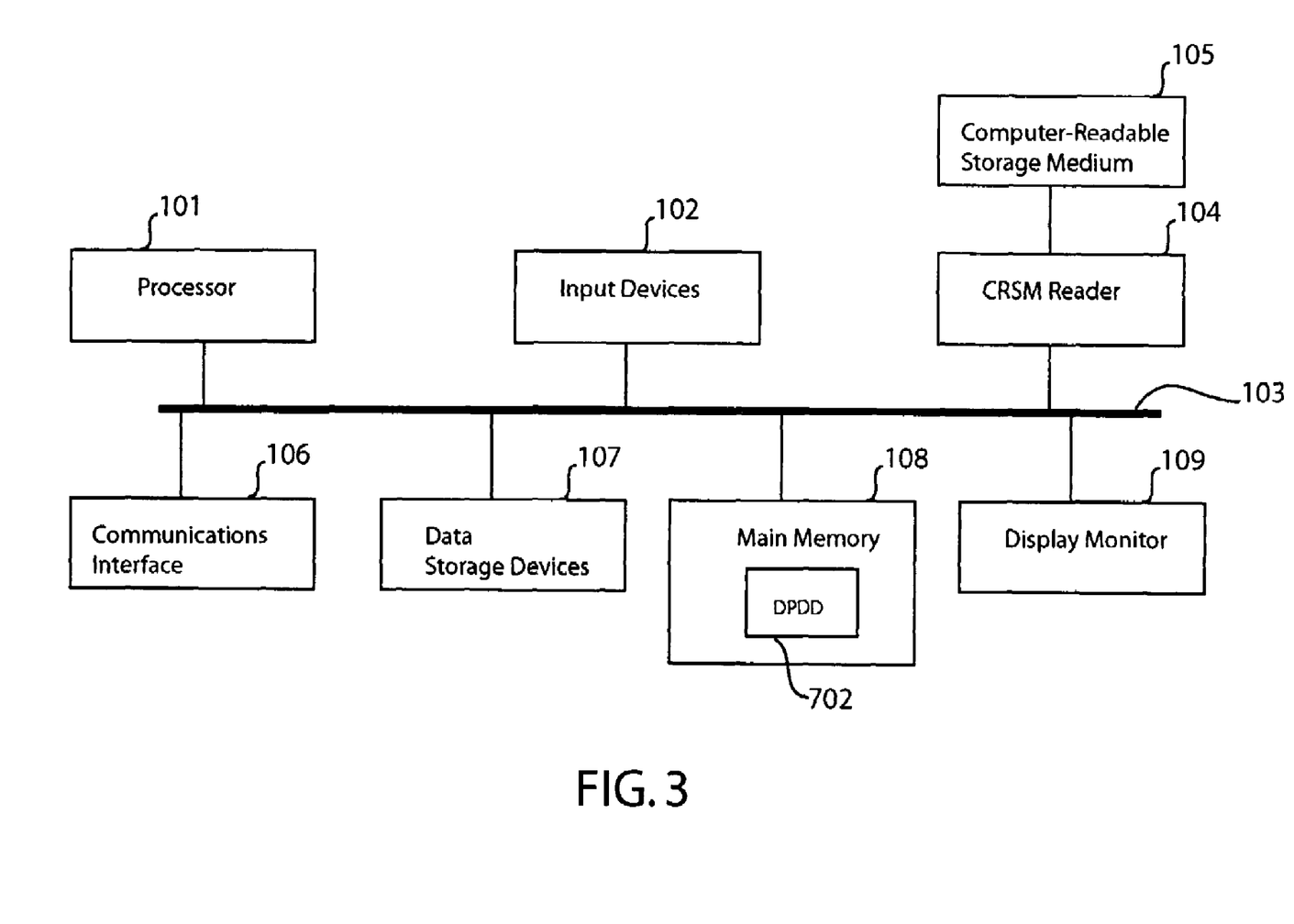
FIG. 3 schematically shows an example computer that may be used in embodiments of the present invention.

Referring now to FIG. 3, there is shown a schematic diagram of an example computer that may be used in embodiments of the present invention. Depending on its configuration, the computer shown in the example of FIG. 3 may be employed as a desktop computer or a server computer, for example. The computer of FIG. 3 may have less or more components to meet the needs of a particular application. As shown in FIG. 3, the computer may include a processor 101, such as those from the Intel Corporation or Advanced Micro Devices, for example. The computer may have one or more buses 103 coupling its various components. The computer may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., cathode ray tube, flat panel display), a communications interface 106 (e.g., network adapter, modem) for coupling to a network, one or more data storage devices 107 (e.g., hard disk drive, optical drive, FLASH memory), and a main memory 108 (e.g., RAM). Software embodiments may be stored in a computer-readable storage medium 105 for reading into a data storage device 107 or main memory 108. In the example of FIG. 3, main memory 108 may be configured to include a Data Packet Detour Driver (DPDD) 702, which is further discussed below. A DPDD 702 may be executed by processor 101.

Figure 4:
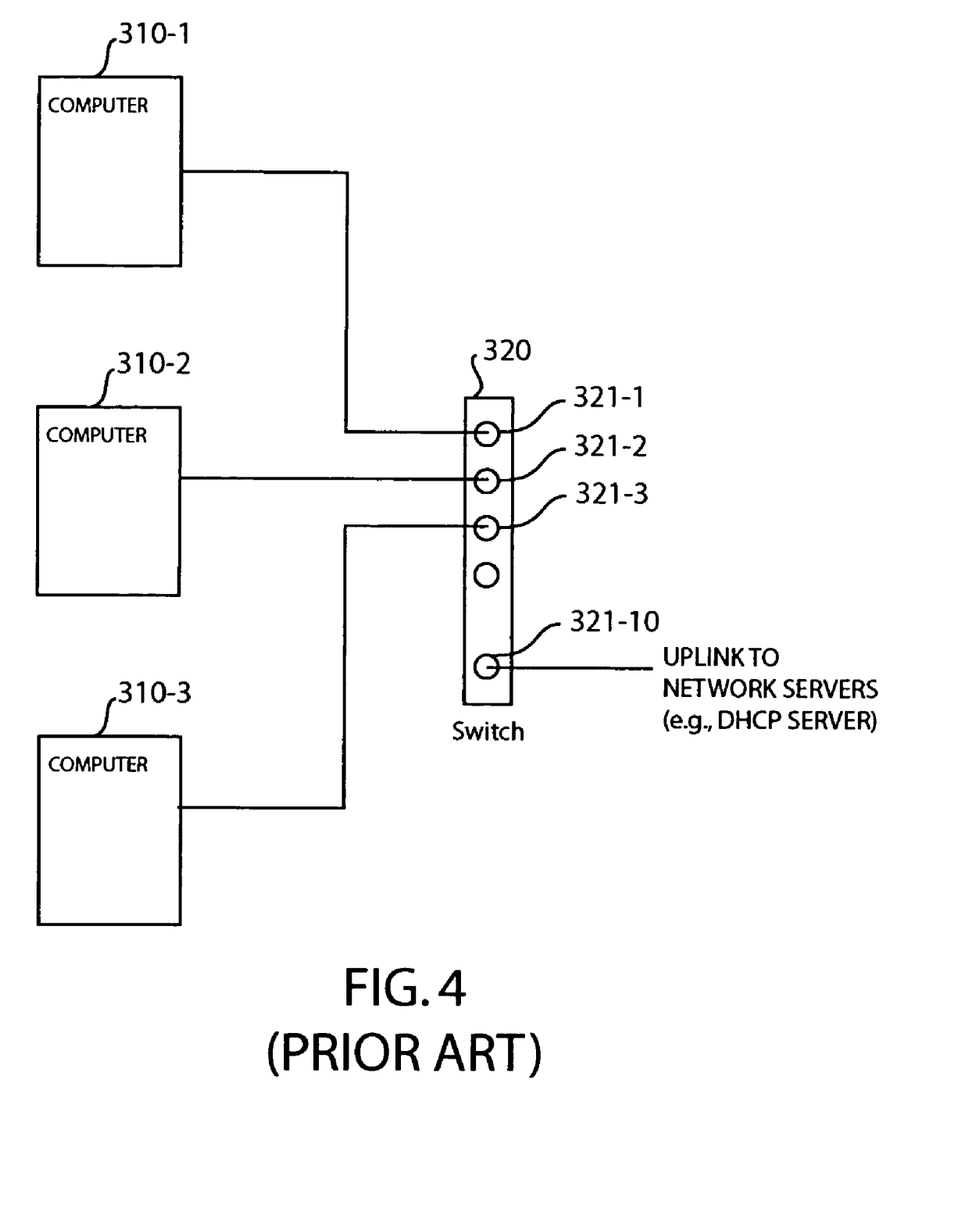
FIG. 4 shows an example switch connecting computers in a computer network.

A computer network may have nodes other than computers. For example, a computer network may also include switches and routers. Compared to a router, a switch forwards data between computers at a relatively low-level protocol. Switches operate at layer 2 of the OSI model, whereas routers operate at layer 3. Layers 2 and 3 of the OSI model are also referred to as the "data link layer" and the "network layer," respectively. FIG. 4 shows an example network switch 320 connecting computers 310 (i.e., 310-1, 310-2, ...). Computers 310 may be desktop computers employed by end-users, for example. Switch 320 includes switch ports 321 (i.e., 321-1, 321-2, ...), which are connected to corresponding computers 310 and other nodes in the network. In the example of FIG. 4, port 321-10 is connected to network servers (not shown), such as a DHCP server. This allows a computer 310 to send and receive packets to and from the DHCP server or other nodes connected to switch 320.

In a network employing DHCP, a DHCP client (e.g., a computer 310) attempting to connect to the network transmits a DHCP request packet to a DHCP server. The DCHP server receives the request packet and, if appropriate, transmits a DHCP response packet back to the client computer. The DHCP response packet contains configuration information for connecting to the network. This communication between a DHCP client computer and a DHCP server occurs whenever a DHCP client computer attempts to join the network, such as when the DHCP client computer is booting up after a reset or from a powered down state, for example.

Figure 5:
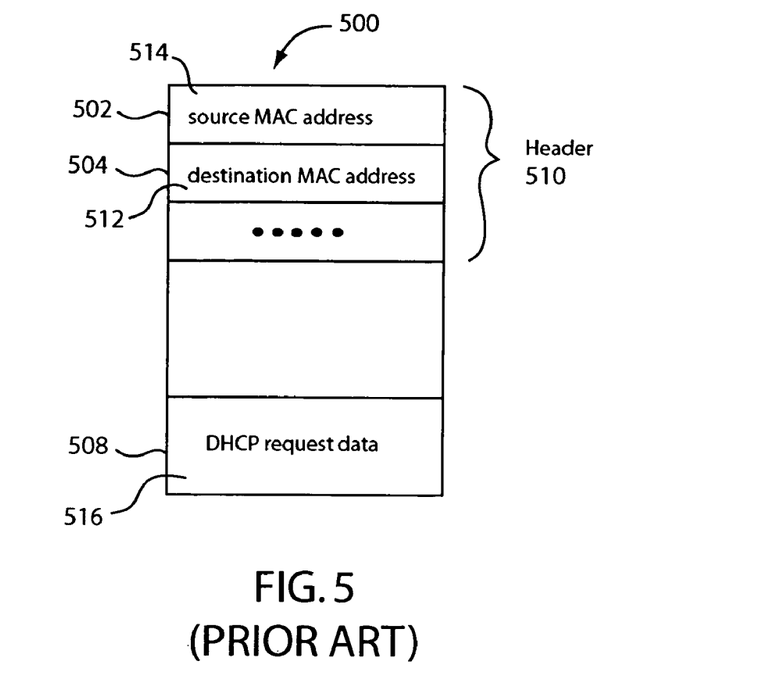
FIG. 5 shows an example data packet.

FIG. 5 schematically shows an example data packet 500. Packet 500 may be an Ethernet packet configured as a DHCP request packet. As such, packet 500 may encapsulate DHCP request data 516 in a portion 508. Other portions of packet 500 include a source address field 502 and a destination address field 504. Source address field 502 contains the MAC (Media Access Control) address (labeled as 514) of the computer originally sending the packet, while destination address field 504 contains the MAC address (labeled as 512) of the computer intended to receive the packet. Fields 502 and 504 may be part of a header 510. Packet 500 may be transmitted from a DHCP client computer after that computer's data link layer (i.e., layer 2 of the OSI model) has been initialized. A switch may examine destination address field 504 to determine where to forward the packet.

Computer networks may require all computers joining the network to be validated for compliance with antivirus enforcement policies. An antivirus enforcement policy may require computers to have the latest version of a particular antivirus program and/or be recently scanned for viruses, for example. Computers that do not comply with the policy may be prevented from accessing the network. For example, a switch or a router may intercept and isolate packets coming from or going to the non-compliant computer. To check if a computer complies with the policy, a client-side agent may be installed on every computer. The agent may listen on a pre-defined socket port and wait for a remote policy server to retrieve the current "posture" of the computer. The posture may indicate the machine ID of the computer, name and version of antivirus program components (scanning engine, pattern file, etc.) on the computer, as well as the last time the computer was scanned for viruses. The policy server may examine the posture to determine if the computer complies with the network's antivirus enforcement policies.

Antivirus enforcement policies may be implemented at layer 2 (switch level) and/or layer 3 (router level) of the OSI model. Antivirus enforcement procedures start when a network gear, such as a switch or a router, detects the first data packet or connection from a computer. Once the network gear detects a newly identified computer, it informs an enforcement policy server to open a connection with the client-side agent on the computer. In the router case, this is generally not a problem because the client-side agent normally would be up and running by the time the router detects the first data packet (note that a computer sends data packets to a router only after its networking stack is fully initialized). In the switch case, however, the client-side agent may not be running yet when the switch detects the first data packet. For example, the computer attempting to connect to the network could still be in booting up status. This prevents the computer from being validated until after complete initialization.

Figure 6:
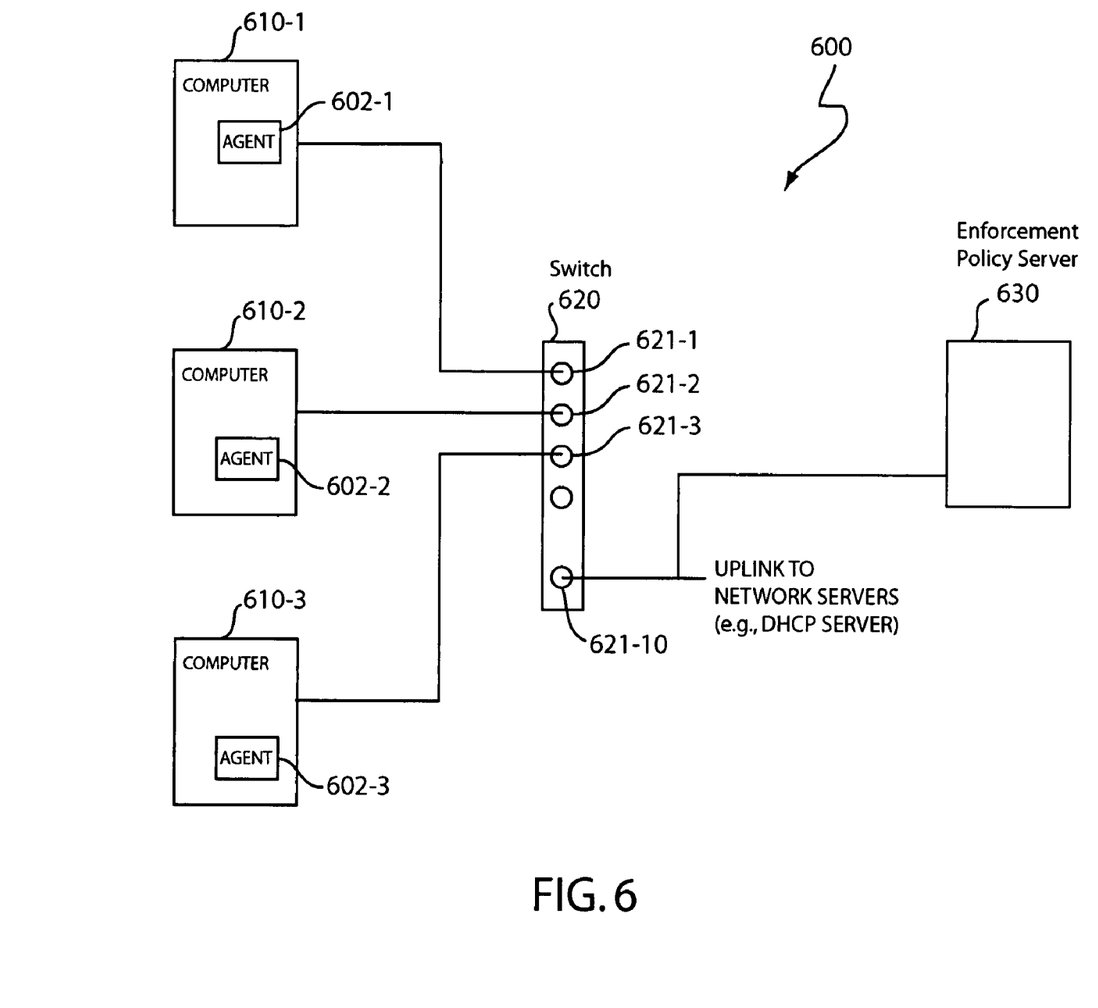
FIG. 6 schematically shows a computer network having antivirus enforcement policies implemented at the switch level.

FIG. 6 schematically shows a computer network 600 having antivirus enforcement policies implemented at the switch level. Network 600 includes computers 610 (i.e., 610-1, 610-2, ...), a network switch 620, and an enforcement policy server 630. Computers 610 may be desktop computers, for example. Each computer 610 may include an agent 602 (i.e., 602-1, 602-2, ...) configured to communicate with policy server 630. An agent 602 monitors a pre-defined socket port in the computer 610, waiting for policy server 630 to retrieve the posture of the computer 610, if needed.

Switch 620 includes switch ports 621 (i.e., 621-1, 621-2 . . . ) connected to corresponding computers 610 and other nodes of the network. In the example of FIG. 6, switch 620 includes an internal mapping table (not shown) identifying those computers that have been validated as complying with the antivirus enforcement policies. The validated computers may be identified by their MAC address, for example.

In an exemplary operation, computer 610-1 may transmit a DCHP request packet intended for a DHCP server connected to port 621-10. Switch 620 receives the DHCP request packet at port 621-1 and consults its internal mapping table to determine if computer 610-1 has been validated as complying with the antivirus enforcement policies of network 600. If so, switch 620 switches the DHCP request packet from port 621-1 to port 621-10, thereby allowing the DHCP request packet to reach the DHCP server. If computer 610-1 has not been validated, switch 620 informs policy server 630 to establish a connection with the client-side agent (agent 602-1 in this case) running in computer 610-1. Once that connection is established, agent 602-1 sends the posture of computer 610-1 to policy server 630. Policy server 630 examines the posture to determine if computer 610-1 complies with the antivirus enforcement policies of network 600. If computer 610-1 is compliant, policy server 630 may inform switch 620 that computer 610-1 has been validated; switch 620 may then accordingly update its internal mapping table. Otherwise, policy server 630 may inform switch 620 to prevent computer 610-1 from accessing the network.

One problem with network 600 is that agent 602-1 may not yet be running when switch 620 receives the DHCP request packet from computer 610-1. For example, computer 610-1 may still be in the early stages of its boot up process when switch 620 receives the DHCP request packet. If computer 610-1 has not been previously validated, policy server 630 will not be able to communicate with agent 602-1 until after complete initialization of computer 610-1. This also prevents computer 610-1 from communicating with the DHCP server to get network access before its agent 602-1 is up and running.

Figure 7:
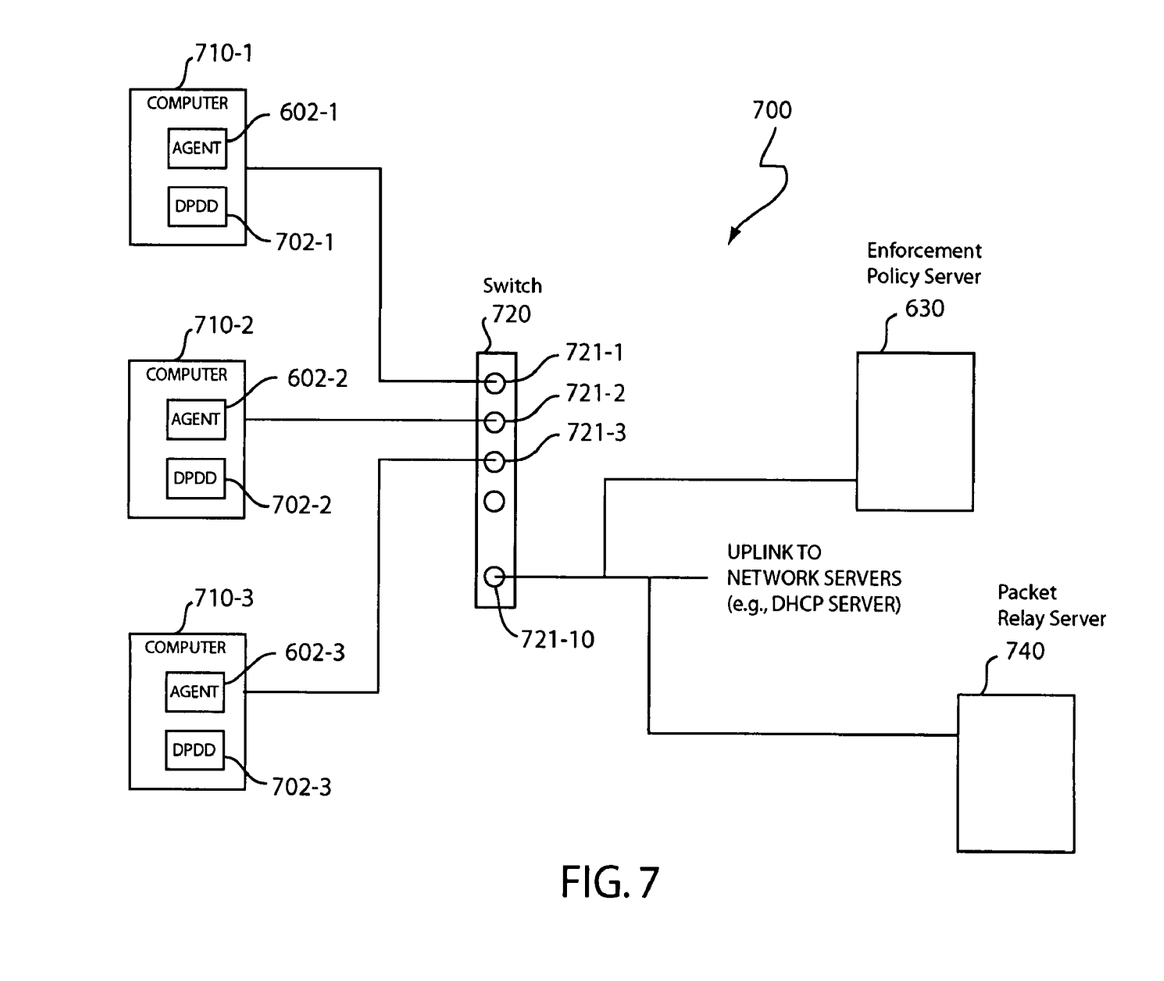
FIG. 7 schematically shows a computer network in accordance with an embodiment of the present invention.

FIG. 7 schematically shows a computer network 700 in accordance with an embodiment of the present invention. Like the previously discussed network 600, network 700 has antivirus enforcement policies implemented using agents 602, switch 720, and enforcement policy server 630. Switch 720 may have an internal mapping table (not shown) identifying those computers 710 (i.e., 710-1, 710-2, . . . ) that have been validated as complying with the antivirus enforcement policies. The validated computers may be identified by their MAC address, for example. Switch 720 includes switch ports 721 (i.e., 721-1, 701-2, . . . ) connected to corresponding computers 710 and other nodes of network 700.

A computer 710, which may be a desktop computer, may have a corresponding agent 602 for providing posture data to policy server 630. In one embodiment, switch 720 only allows packets from validated computers 710 to pass. When switch 720 detects a packet from a computer 710 that has not been validated, switch 720 accordingly informs policy server 630. Policy server 630 makes a connection to the agent 602 of that computer 710 to receive its posture data. If the posture data indicate that the computer 710 complies with the antivirus enforcement policies of network 700, the computer 710 is indicated in the internal mapping table of switch 720 as being validated. Otherwise, packets from the computer 710 are not allowed to pass through switch 720. Other actions may also be taken if the computer 710 is non-compliant to the antivirus enforcement policies.

In the example of FIG. 7, each computer 710 further includes a Data Packet Detour Driver (DPDD) 702 (i.e., 702-1, 702-2, . . . ). A DPDD 702 may comprise computer-readable program code for redirecting packets generated in a computer 710. A DPDD 702 may comprise a kernel driver for modifying the destination addresses of data packets generated by a computer 710.

In one embodiment, a DPDD 702 is employed to redirect early generated packets. Depending on the application, a DPDD 702 may modify all packets generated by a computer 710 before complete initialization of that computer's network protocol drivers, network-enabled applications (e.g. an agent 602), networking stack, or start up programs, for example. As another example, a DPDD 702 may modify all packets generated by a computer 710 after complete initialization of that computer's data link layer but before complete initialization of that computer's network layer. Being a kernel driver allows a DPDD 702 to come up before layer 3 components of a computer 710, and allows it to detect the state of the computer 710. A DPDD 702 may thus modify data packets generated by computer 710 before an agent 602 is up and running.

A DPDD 702 may be employed to modify packets generated by a computer 710 prior to complete initialization of its agent 602. For example, the DPDD 702 may be configured to wait for a signal from the agent 602 that the agent 602 has fully initialized. In that example, the agent 602 may employ a dynamic link library (DLL) and application programming interface (API) to communicate with the DPDD 702. The agent 602 may call the API to inform the DPDD 702 that it has fully initialized and is waiting for a connection request from an enforcement policy server 630. Another way of detecting complete initialization of the agent 602 is to have the DPDD 702 detect whether a specific socket port monitored by the agent 602 (for connection with an enforcement policy server) has been bound and listened on. On Microsoft Windows™ platforms, this event may be detected by hooking to the kernel TDI (transport driver interface). Other ways of detecting complete initialization of an application program may also be employed without detracting from the merits of the present invention.

If the agent 602 has not completely initialized, the DPDD 702 may intercept all packets generated by the computer 710 and modify them. A DPDD 702 may modify a data packet such that the packet is redirected to a packet relay server when the packet is actually intended for another computer. The packet relay server may then forward the packet to the intended destination computer. In the DHCP request example, a DPDD 702 may modify DHCP request packets from computers 710 that have been configured as DHCP clients prior to complete initialization of their agent 602. The DHCP request packet may be modified such that it is redirected to a packet relay server 740 instead of to the DHCP server (not shown) connected to port 721-10. Packet relay server 740 may then forward the DHCP request packet to the DHCP server. This advantageously allows the computer 710 to communicate with the DHCP server and complete initialization of its level 3 components before its agent 602 is up and running. In effect, this allows the computer 710 to by-pass antivirus enforcement at switch 720 before the computer 710 is completely initialized, thereby allowing the computer 710 to properly boot up. A DPDD 702 may cease modifying packets from the computer 710 after the computer 710 is completely initialized, or after receiving a signal (e.g., from policy server 630) to cease modifying packets. This results in the computer 710 having to undergo antivirus enforcement validation process when switch 720 first detects data packets from the computer 710, as in the normal case. As will be more apparent below, in other embodiments, a data packet detour driver (DPDD) may also modify packets generated at a computer even after one or more components of that computer have completely initialized.

In the aforementioned example, switch 720 may be modified such that it does not apply antivirus enforcement policies on packets destined for relay server 740 or coming from the DHCP server. For example, switch 720 may be programmed to allow all packets having the MAC address of the packet relay server 740 in the destination address field or the MAC address of the DHCP server in the source address field. Such modifications to a switch are relatively simple to do and do not raise security concerns as only specified computers are involved. Packet relay server 740, switch 720, and the DHCP server are in the same network segment in the aforementioned example. Enforcement policy server 630 may also be located in the same network segment for performance reasons.

Figure 8:
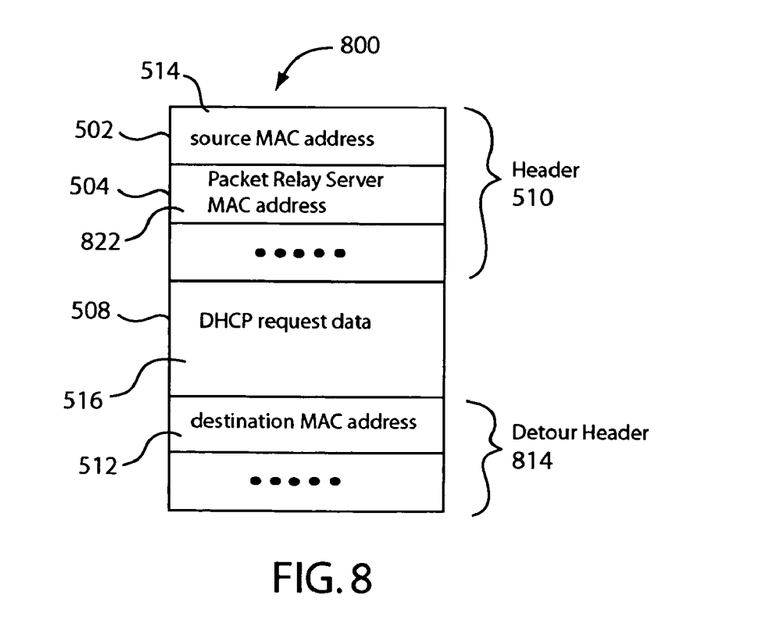
FIG. 8 schematically shows a data packet in accordance with an embodiment of the present invention.

FIG. 8 schematically shows a data packet 800 in accordance with an embodiment of the present invention. Similar to a packet 500 (see FIG. 5), a packet 800 may include a header 510 comprising a source address field 502 and a destination address field 504. Packet 800 further includes a detour header 814 containing the destination address of the computer originally intended to receive the packet. The detour packet header 814 may also include an identifier, the size of the detour packet header, and other information. The detour packet header 814 is preferably placed at the end of the packet 800 for increased processing performance at the packet relay server 740. For example, placing the detour packet header 814 at the end of the packet 800 obviates the need to move or copy payload data (e.g., those in portion 508) to compact the packet.

Packet 800 may be the result of modifying a packet 500. A DPDD 702 may modify a packet 500 such that an intended destination MAC address 512 is removed from destination address field 504 and placed in the detour header 814. The DPDD 702 may then place the address of a packet relay server (e.g., packet relay server 740) in destination address field 504. This results in the packet 800 being sent to the packet relay server instead of the computer having the destination MAC address 512. The packet relay server may then forward the payload (e.g., the DHCP request data 516) of the packet 800 to the computer having the destination MAC address 512, using another packet, for example.

In the DHCP example, packet 800 may include the DHCP request data 516 in portion 508, the MAC address of the sending computer 710 (labeled as 514) in source address field 502, the MAC address (labeled as 822) of relay server 740 in destination address field 504, and the MAC address of the DHCP server in detour header 814. This allows packet 800 to be redirected to relay server 740. After receiving packet 800, relay server 740 may then forward the DHCP request data 516 to the DHCP server. For example, the DHCP request data 516 may be included in the payload of a conventional data packet transmitted from relay server 740 to the DHCP server. Note that the DHCP request data 516 may be resolved to determine the address of the DHCP client, which in this example is a computer 710. That is, the DHCP server may extract the DHCP request data 516 from a packet received from relay server 740, determine the address of the DHCP client (i.e., the computer 710) from the DHCP request data 516, and then directly communicate with the computer 710. Advantageously, the aforementioned redirection process is relatively transparent to the DHCP server.

In light of the present disclosure, it can be appreciated that the present invention may be generally employed to control network traffic. For example, embodiments of the present invention may be used to redirect data units, such as packets, to relay servers where the data units may be further processed before being forwarded to their originally intended destinations. This advantageously allows for further processing of the data units in situations where they are normally transferred directly from one computer to another. For example, embodiments of the present invention advantageously allow the redirected data units to be scanned for viruses at a relay computer. This redirection and scanning may be performed regardless of whether one or more components of the computer sending the data units are completely initialized.

Embodiments of the present invention may also be employed to quarantine selected packets being transmitted by a computer. For example, a data packet detour driver may be employed to redirect selected (rather than all) packets to a packet relay server to be quarantined. A data packet detour driver may be configured to redirect certain types of traffic, such as those destined for socket port 80 (HTTP traffic), to a packet relay server. At the packet relay server, the quarantined packets may be scanned for compliance with general policies (e.g., prohibit transfer of confidential information) or held for a period of time (e.g., until after an emergency or a virus outbreak is over).

Embodiments of the present invention may also be employed as a software switch. For example, a DPDD 702 may be employed to redirect certain types of traffic (e.g., HTTP, socket port 80) to a particular relay server, and other types of traffic (e.g., e-mail, socket port 25) to another relay server.

Figure 9:
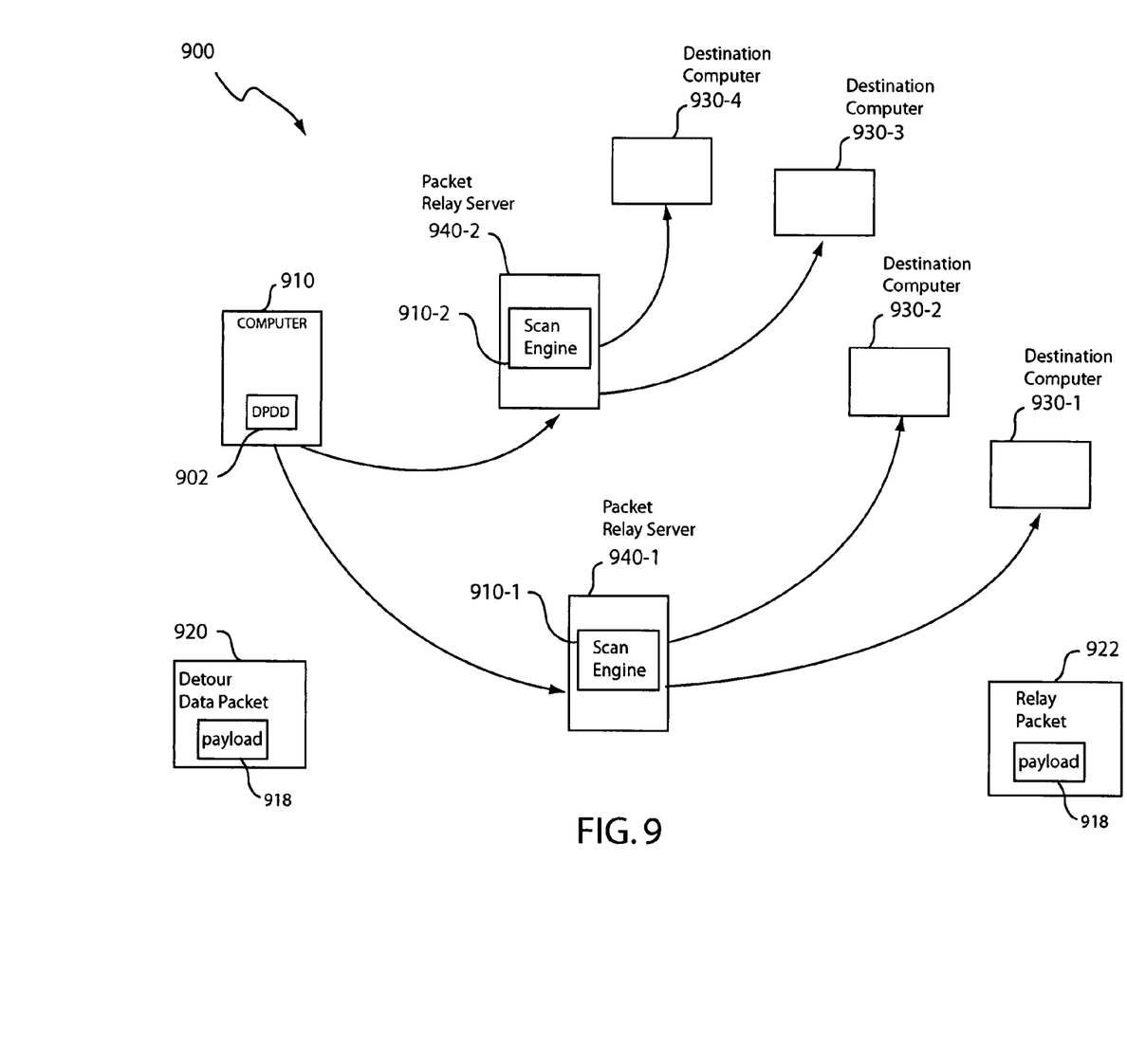
FIG. 9 schematically shows a computer network in accordance with an embodiment of the present invention.

FIG. 9 schematically shows a computer network 900 in accordance with an embodiment of the present invention. Network 900 includes a computer 910, packet relay servers 940 (i.e., 940-1, 940-2, . . . ), and destination computers 930 (i.e., 930-1, 930-2, . . . ). The computer 910 may be a desktop computer that includes a data packet detour driver (DPDD) 902. The DPDD 902 may be a kernel driver similar to a DPDD 702. discussed in connection with FIG. 7, except that the DPDD 902 may modify a data packet for rerouting regardless of whether the computer 910 has completely initialized. That is, the DPDD 902 may be generally employed to redirect packets generated by the computer 910. A packet relay server 940 may be a server computer that includes a scan engine 910 (i.e., 910-1, 910-2, . . . ) for scanning packets for computer viruses, policy enforcement, or other reasons. A destination computer 930 may be any type of computer intended to receive a packet from the computer 910. A destination computer 930 may be a DHCP server, another computer 910, or another network node, for example.

In the example of FIG. 9, the DPDD 902 modifies a data packet generated in computer 910 intended for a destination computer 930. Depending on the application, the DPDD 902 may modify all or only selected packets. For example, the DPDD 902 may modify only those packets destined for destination computer 930-1, destination computer 930-2, or both. As another example, the DPDD 902 may modify only certain types of traffic, such as packets destined for socket port 80 (HTTP traffic) or socket port 25 (e-mail). The data packet is modified such that it is rerouted to a packet relay server 940. The DPDD 902 may be configured to redirect certain types of traffic to packet relay server 940-1, and other types of traffic to packet relay server 940-2. The DPDD 902 may include a mapping table (not shown) indicating which packet relay server 940 to be used depending on the intended destination computer 930 or the type of the data packet being modified.

The DPDD 902 may modify a destination address field of a data packet to contain the address of a packet relay server 940 instead of the intended destination computer 930. The address of the destination computer 930 may be retained in another portion of the data packet, such as in a detour header. The address of the computer 910 remains in the source address field of the data packet. In the example of FIG. 9, the DPDD 902 may so modify the data packet even after the computer 910 has completely initialized. The resulting data packet is referred to as detour data packet 920 and forwarded to a packet relay server 940. The detour data packet 920 includes a payload 918 to be provided to the destination computer 930.

The detour data packet 920 may be processed at the packet relay server 940. In one embodiment, a scan engine 910 scans the detour data packet 920 for viruses or prohibited content (e.g., confidential information, inappropriate language). It should be noted that the mechanics of scanning data for computer viruses or prohibited content, in general, is known in the art and not further described here. The detour data packet 920 may be also be quarantined at the packet relay server 940. For example, packet relay server 940-1 may be configured to hold all data packets destined for destination computer 930-2 until destination computer 930-2 has been fixed.

A packet relay server 940 may extract the address of the destination computer 930 from a portion of the detour data packet 920. The packet relay server 940 may then forward the payload 918 to that destination computer 930 using another packet, which is labeled as relay packet 922 in FIG. 9. The source address field of relay packet 922 may indicate the MAC address of the packet relay server 940, while the destination address field of the data packet 922 may indicate the MAC address of the destination computer 930. The packet relay server 940 may determine the address of the intended destination computer 930 by examining a portion (e.g., detour header) of the detour data packet 920. Depending on the application, the payload 918 may also indicate the address of the computer 910.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling traffic in a computer network, the method comprising:

modifying a data unit to be sent by a first computer, the data unit being intended for a second computer, the data unit being modified such that the data unit is redirected from the first computer to a third computer, the data unit being generated in and originating from the first computer and being sent by the first computer to connect to the computer network;

sending the data unit from the first computer to the third computer;

forwarding the data unit from the third computer to the second computer;

wherein the data unit is modified in the first computer prior to initialization of a network-enabled application in the first computer: and wherein a destination address field of the data unit is modified to contain an address of the third computer in a destination address field and an address of the second computer in another portion of the data unit.

2. The method of claim 1 wherein the data unit is selected to be modified based on an intended destination of the data unit.

3. The method of claim 1 wherein the data unit comprises an Ethernet packet.

4. The method of claim 1 wherein the second computer comprises a DHCP (Dynamic Host Configuration Protocol) server.

5. The method of claim 1 further comprising:

scanning the data unit for viruses at the third computer.

6. The method of claim 1 wherein the data unit is quarantined at the third computer.

7. The method of claim 1 wherein the third computer is selected to receive the data unit based on an intended destination of the data unit.

8. A method of controlling traffic in a computer network, the method comprising:

modifying a DHCP (dynamic host configuration protocol) packet at a first computer prior to initialization of a network-enabled application in the first computer, the DHCP packet being intended for a DHCP server, the DHCP packet being modified to be redirected to a second computer;

processing the DHCP packet at the second computer; and forwarding the DHCP packet from the second computer to the DHCP server;

forwarding a response packet from the DHCP server to the first computer after the response packet is forwarded from the second computer to the DHCP server; and wherein modifying the DHCP packet at the first computer comprises including an address of the second computer in a destination address field of the DHCP packet and including an address of the DHCP server in another portion of the DHCP packet.

9. The method of claim 8 wherein processing the DHCP packet at the second computer includes scanning the DHCP packet for viruses.

* * * * *